United States Patent
Ivory et al.

(10) Patent No.: US 9,987,708 B2
(45) Date of Patent: Jun. 5, 2018

(54) AUTOMATED WELD REPAIR OF COMBUSTOR LINERS

(71) Applicant: United Technologies Corporation, Hartford, CT (US)

(72) Inventors: Steven Ivory, Ashford, CT (US); Monika D. Kinstler, Manchester, CT (US); David A. Gaudreau, East Granby, CT (US)

(73) Assignee: United Technologies Corporation, Farmington, CT (US)

( * ) Notice: Subject to any disclaimer, the term of this patent is extended or adjusted under 35 U.S.C. 154(b) by 476 days.

(21) Appl. No.: 14/635,639

(22) Filed: Mar. 2, 2015

(65) Prior Publication Data
US 2016/0256957 A1 Sep. 8, 2016

(51) Int. Cl.
*B23K 26/21* (2014.01)
*B23K 10/02* (2006.01)
(Continued)

(52) U.S. Cl.
CPC ............ *B23K 26/21* (2015.10); *B23K 10/027* (2013.01); *B23K 26/144* (2015.10); *B23K 26/342* (2015.10); *B23P 6/00* (2013.01); *B23P 6/007* (2013.01); *F01D 5/005* (2013.01); *F01D 5/284* (2013.01); *F01D 5/288* (2013.01); *F02K 1/822* (2013.01); *F23R 3/002* (2013.01); *F23R 3/007* (2013.01); *B23K 2201/00* (2013.01); *B23K 2201/001* (2013.01); *B23K 2203/52* (2015.10); *B23P 2700/13* (2013.01); *F05D 2230/232* (2013.01); *F23R 2900/00019* (2013.01); *Y02T 50/675* (2013.01); *Y10T 29/49721* (2015.01); *Y10T 29/49726* (2015.01); *Y10T 29/49728* (2015.01)

(58) Field of Classification Search
CPC .. B23P 6/00; B23P 6/007; B23P 6/002; F23R 3/00; F23R 3/002; F23R 2900/00017; F23R 2900/00019; F23R 2900/00018; Y10T 29/49728; Y10T 29/49726; Y10T 29/49725; Y10T 29/49723; Y10T 29/49721; Y10T 29/49732; Y10T 29/49734; Y10T 29/49742
USPC ...................................................... 219/76.11
See application file for complete search history.

(56) References Cited

U.S. PATENT DOCUMENTS

| | | | |
|---|---|---|---|
| 4,942,732 A * | 7/1990 | Priceman | ................ C23C 28/00 416/241 B |
| 5,622,638 A | 4/1997 | Schell | |

(Continued)

OTHER PUBLICATIONS

Toms Torims, "The Application of Laser Cladding to Mechanical Component Repair, Renovation and Regeneration, Chapter 32 in DAAAM International Scientific Book 2013", pp. 587-608, B. Katalinic & Z. Tekic (Eds.), Published by DAAAM International, ISBN 978-3-901509-94-0, ISSN 1726-9687, Vienna, Austria, 2013.

(Continued)

*Primary Examiner* — Jason L Vaughan
(74) *Attorney, Agent, or Firm* — O'Shea Getz P.C.

(57) ABSTRACT

Aspects of the disclosure are directed to repairing or restoring a liner associated with a combustor of an aircraft engine. The liner is at least partially stripped of at least one detail. An automated welding operation is applied to the liner. A coating of the liner on a cold side of the liner is retained on the liner during the welding operation.

14 Claims, 3 Drawing Sheets

(51) Int. Cl.
  B23P 6/00      (2006.01)
  F01D 5/00      (2006.01)
  F23R 3/00      (2006.01)
  B23K 26/342    (2014.01)
  B23K 26/144    (2014.01)
  F01D 5/28      (2006.01)
  F02K 1/82      (2006.01)
  B23K 101/00    (2006.01)
  B23K 103/00    (2006.01)

(56) References Cited

U.S. PATENT DOCUMENTS

| | | | |
|---|---|---|---|
| 5,686,001 A | 11/1997 | Wrabel et al. | |
| 6,054,672 A | 4/2000 | Foster | |
| 6,296,447 B1 | 10/2001 | Rigney et al. | |
| 6,302,649 B1 | 10/2001 | Mukira | |
| 6,530,971 B1 | 3/2003 | Cohen | |
| 6,925,810 B2 | 8/2005 | Swaffar | |
| 7,146,725 B2 | 12/2006 | Kottilingam | |
| 7,484,651 B2 | 2/2009 | Gandy | |
| 7,966,707 B2 | 6/2011 | Szela | |
| 8,373,089 B2* | 2/2013 | Johnson | F01D 5/005 219/121.64 |
| 8,397,511 B2* | 3/2013 | Chen | F01D 9/023 60/752 |
| 8,904,635 B2* | 12/2014 | Berkebile | B23K 1/0056 219/121.61 |
| 9,149,881 B2* | 10/2015 | Ito | B23K 1/0018 |
| 2009/0113706 A1 | 5/2009 | Emilianowicz | |
| 2012/0156020 A1 | 6/2012 | Kottilingam et al. | |
| 2014/0069893 A1 | 3/2014 | Bruck | |
| 2014/0174091 A1 | 6/2014 | Ivory et al. | |
| 2014/0216042 A1 | 8/2014 | Hanson | |
| 2014/0220380 A1 | 8/2014 | Sarabanda | |

OTHER PUBLICATIONS

C.L. Sexton, "Hardfacing: Traditional Versus Laser", downloaded from <http://www.laserage.ie/files/papers/Hardfacing%20-%20Traditional%20vs%20Laser%20-%20LaserAge%20Ltd.pdf> on Jan. 14, 2015.

UTP Maintenance by voestalpine, "Thermal Spraying Powders and Arc Spraying Cored Wires", downloaded from <http://www.utp-maintenance.com> on Jan. 14, 2015.

DMG MORI, "LASERTEC Series", downloaded from <http://en.dmgmori.com/blob/120872/cc1b707f03ee3c2b0bfc81d22c3442ca/pl0uk13-lasertec-series-pdf-data.pdf> on Jan. 14, 2015.

A. A. Lugan, "Qualification of Nd: YAG Laser Direct Metal Deposition Techniques for Repair of Nickel Superalloy Components", Paper presented at 25th International Congress on Applications of Lasers & Electro-Optics (ICALEO 2006), Oct. 30-Nov. 2, 2006, Scottsdale, AZ, USA.

Hermann Lembeck, "Laser Hybrid Welding of Thick Sheet Metals with Disc Lasers in the Shipbuilding Industry", Wiley Online Library, Laser Technik Journal, vol. 7, Issue 2, published online Apr. 28, 2010.

J. Dutta Majumdar, "Laser Material Processing", Institute of Materials, Minerals and Mining and ASM International, Published by Maney for the Institute and ASM International, DOI 10.1179/1743280411Y.0000000003, vol. 56, No. 5/6, pp. 341-388, 2011.

Elsevier, "Repair of Worn Surfaces", Tribology Handbook D17, available at www.knovel.com, 1995.

Extended EP Search Report dated Jul. 4, 2016.

* cited by examiner

AUTOMATED WELD REPAIR OF COMBUSTOR LINERS

BACKGROUND

Liners associated with a combustor of an aircraft experience oxidation and thermo mechanical fatigue (TMF). As a result of the oxidation and TMF, a base material (e.g., alloy) of the liner may be subject to burning, cracking, or erosion. Currently, there is not a repair/restoration technique that is adequate to address these conditions. Gas tungsten arc welding (GTAW) and tungsten inert gas (TIG) welding techniques cause distortion and melt back requiring additional, costly remedial processing to be performed. GTAW and TIG also subject the liner to heat affected zone (HAZ) cracking.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method for repairing or restoring a liner associated with a combustor of an aircraft engine, comprising: at least partially stripping the liner of at least one detail, and applying an automated welding operation to the liner, wherein a coating of the liner on a cold side of the liner is retained on the liner during the welding operation. In some embodiments, the stripping comprises a removal of hardware from the liner. In some embodiments, the hardware comprises a nut. In some embodiments, the stripping comprises a removal of a second coating on a hot side of the liner. In some embodiments, the second coating comprises at least one of a metal or a ceramic material. In some embodiments, the coating comprises a thermal barrier coating. In some embodiments, the method further comprises subjecting the liner to blending prior to applying the welding operation. In some embodiments, the method further comprises applying a brush to remove a film from the liner prior to applying the welding operation. In some embodiments, the welding operation is based on at least one of an application of a laser weld powder feed or plasma welding. In some embodiments, a value for at least one parameter is selected as part of the welding operation. In some embodiments, the value is selected based on an identification of the liner. In some embodiments, the at least one parameter comprises at least one of temperature, beam length, or intensity. In some embodiments, the welding operation is performed at a temperature that ensures that fusion occurs in an amount greater than a first threshold.

Aspects of the disclosure are directed to a liner associated with a combustor of an aircraft engine, wherein the liner is subject to at least a partial stripping of at least one detail, and wherein the liner is subject to an automated welding operation, wherein a coating of the liner on a cold side of the liner is retained on the liner during the welding operation. In some embodiments, the stripping comprises a removal of a nut from the liner. In some embodiments, the stripping comprises a removal of a second coating on a hot side of the liner. In some embodiments, the second coating comprises at least one of a metal or a ceramic material. In some embodiments, the coating comprises a thermal barrier coating. In some embodiments, the liner is subjected to blending prior to being subjected to the welding operation. In some embodiments, the welding operation is based on at least one of an application of a laser weld powder feed or plasma welding.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
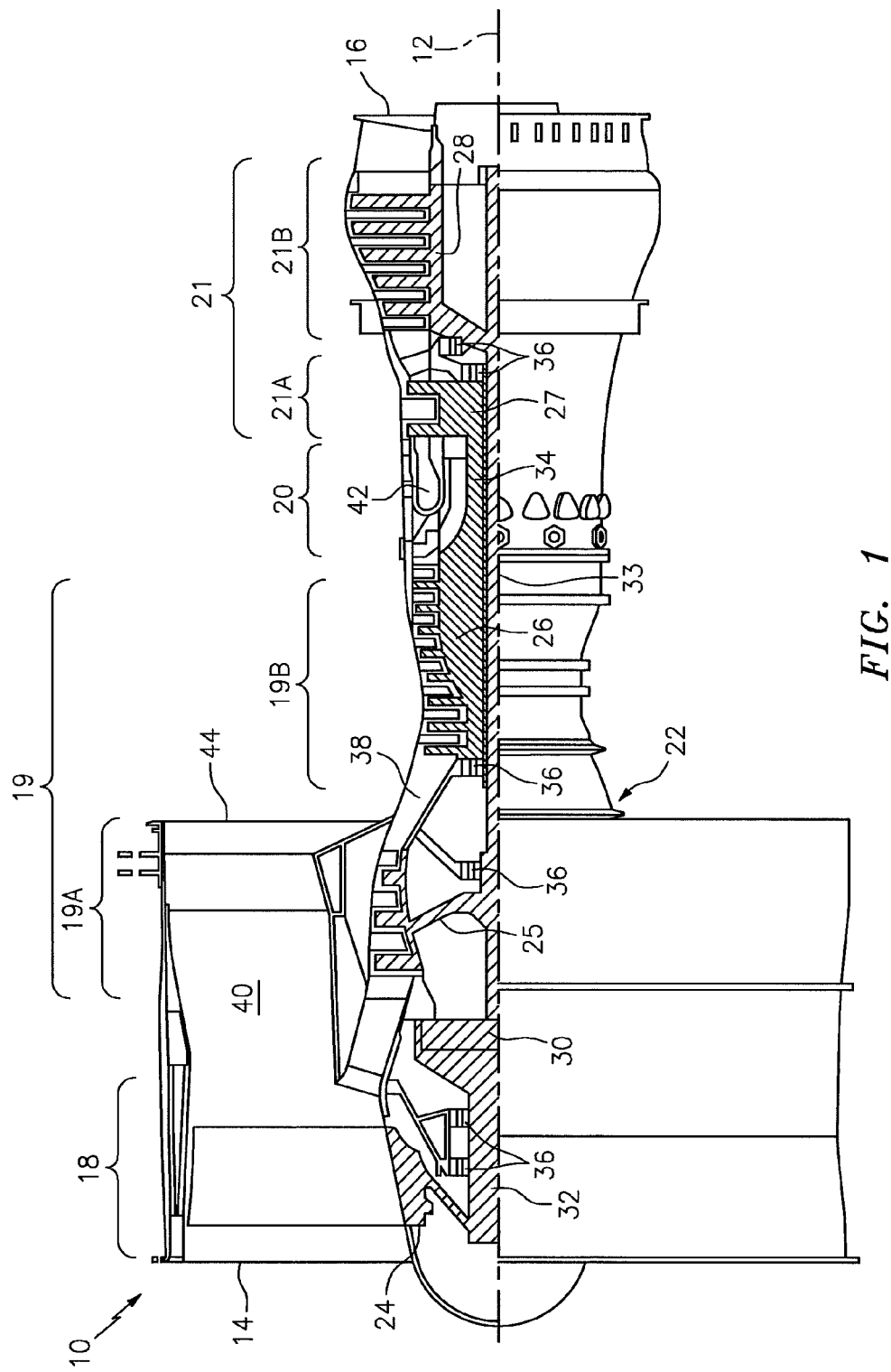
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for restoring/repairing a component of an engine, such as for example a liner of a combustor of an aircraft. In some embodiments, a surfacing weld build-up technique is used. The technique may incorporate the use of a laser weld powder or wire feed process and may be automated. In some embodiments, the technique provides for a controlled, precise, and repeatable low heat input weld to restore the component.

FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

The engine 10 is illustrative. Aspects of the disclosure may be applied in connection with other engine types or configurations.

Figure 2:
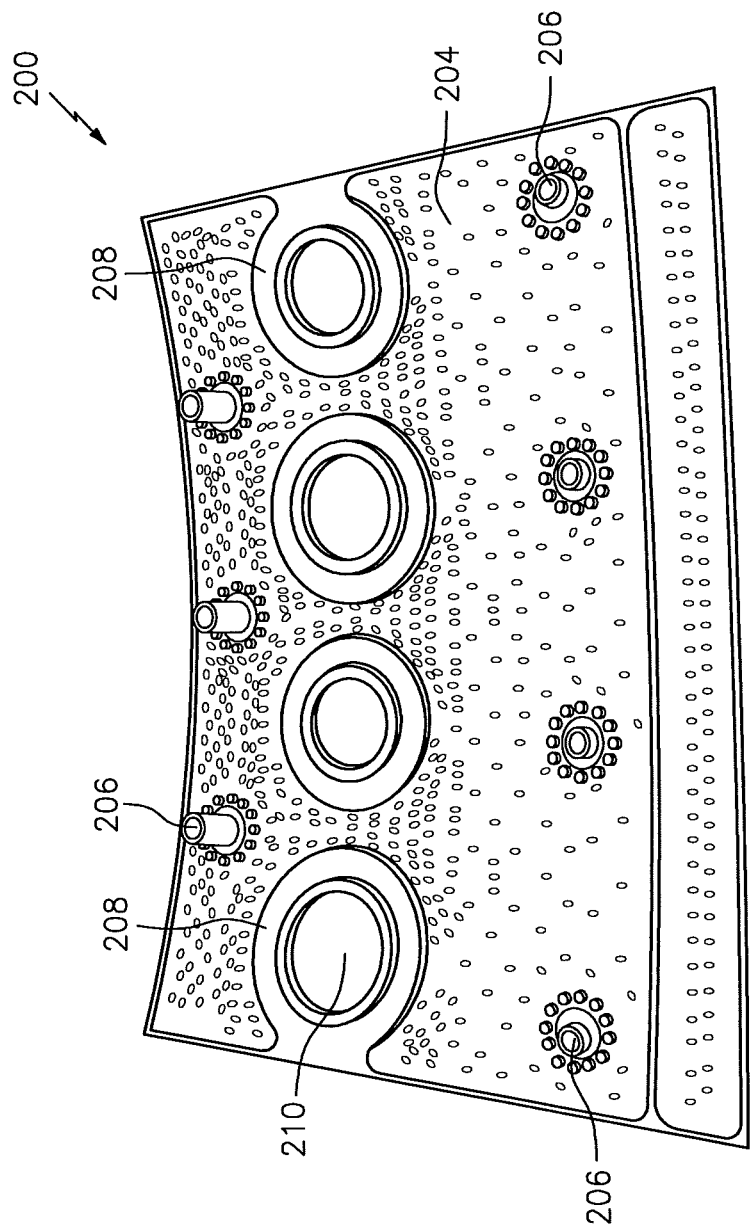
FIG. 2 illustrates an exemplary liner.

Referring to FIG. 2, a portion of a liner 200 is shown. The liner 200 may be associated with an engine, such as the engine 10 of FIG. 1.

In some embodiments, the liner 200 includes a panel 204. The panel 204 may take the form of a tiled structure that includes threaded studs 206 that allow the panel 204 to be bolted to a shell (not shown). In some embodiments, the panel 204 includes grommets 208. At the center of the grommets 208 there may be dilution holes 210 that provide a combustion flow to the panel 204 and the associated combustor (e.g., combustor section 20 of FIG. 1). In some embodiments, the panel 204 interfaces to the high temperatures associated with the combustor. The liner 200 (e.g., the panel 204) may include one or more cooling pins/protrusions (not shown).

The liner 200 is illustrative. Aspects of the disclosure may be applied in connection with other types or configurations of liners.

In some embodiments, a liner (e.g., liner 200) is fabricated using a casting technique. In some embodiments, the liner is relatively thin along a given dimension. For example, the liner may be approximately 0.040 inches (1.016 millimeters) thick.

In some embodiments, the hot side/surface of a liner (e.g., the side/surface of the liner that faces the combustion environment) includes a coating (e.g., a thermal barrier coating (TBC)) that is comprised of one or more materials, such as a metal or a ceramic material. The cold side/surface of the liner (e.g., the side/surface of the liner that is exterior to, or furthest removed from, the combustion environment) that typically includes any studs 206 or cooling pins/protrusions may be coated with aluminide. The aluminide coating operates as an insulator, making it more likely that the part 'overheats' and leads to failure.

In some embodiments, stripping away the coating on the cold side/surface can prove challenging and could result in a loss of base material or wall thickness associated with the liner. If base material is lost in an amount greater than a threshold it may be necessary to scrap or throw-away the liner.

On the other hand, if the welding operation is performed on a liner that still has the cold side/surface coating (e.g., in an amount greater than a threshold), the quality of the liner following the welding operation may be less than ideal or inadequate (e.g., cracks or the impact of erosion may still be present in an amount greater than a threshold) and/or the cold side/surface coating may end up melting or diffusing the cold side coating into the base material. In one aspect, in embodiments that possess an aluminide coating, the aluminde migrates or diffuses into the base material.

In accordance with aspects of the disclosure, a surface weld build-up technique may be used to repair/restore a combustor liner. In some embodiments, the technique may include a deposition of a material (e.g., a powder) subject to a low-heat input/weld. Such a low-heat input/weld provides adequate fusion (e.g., fusion in an amount greater than a threshold) without causing weld cracking or HAZ cracking, or at least ensures that any cracking that does occur is less than a threshold amount.

Figure 3:
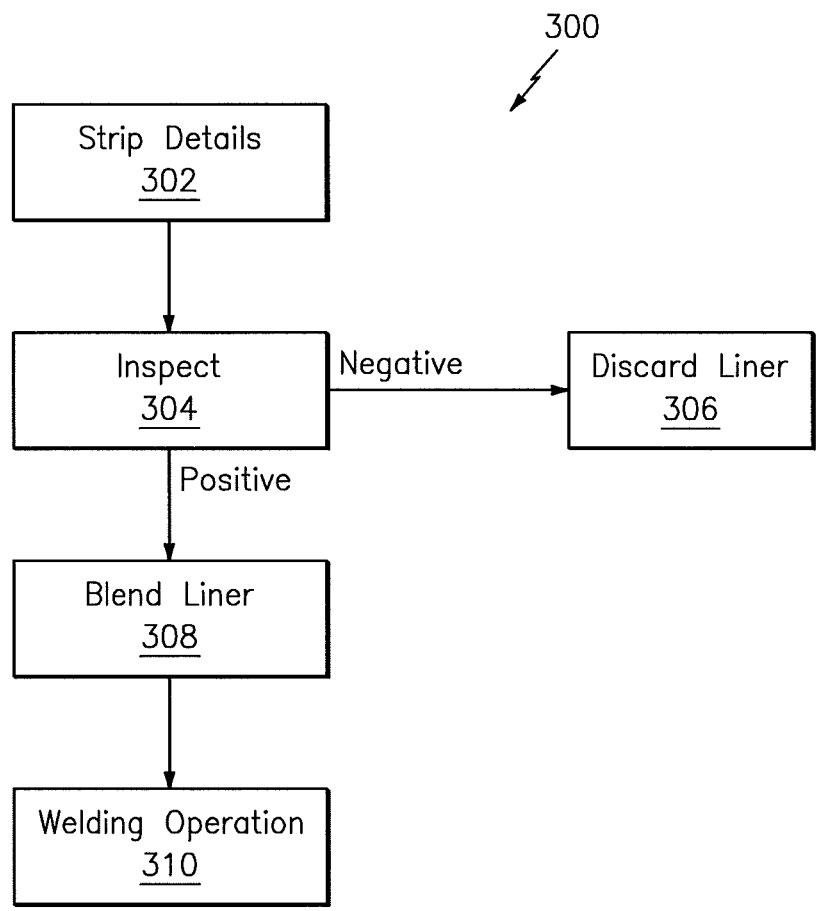
FIG. 3 illustrates a flow chart of an exemplary method for restoring/repairing a liner.

Referring now to FIG. 3, a flow chart of an exemplary method 300 is shown. In some embodiments, the method 300 is used to repair/restore a component or device. For example, the method 300 may be used to repair/restore a liner of a combustor associated with an engine of an aircraft, and the method 300 is described below in connection with such an exemplary application context. In some embodiments, the method 300 is executed as part of a maintenance activity, such as a scheduled maintenance activity.

In block 302, one or more details are stripped, or partially stripped, from the liner. As part of block 302, hardware (e.g., a nut) and/or one or more coatings associated with the liner may be stripped (e.g., partially stripped) or removed as part of block 302. For example, a coating associated with the hot side/surface of the liner may be removed as part of block 302. The coating associated with the cold side/surface of the liner may remain intact (e.g., might not be subjected to stripping or may be strip-free).

In block 304, an inspection is performed. The inspection of block 304 may include an inspection for, e.g., erosion, cracking, etc. If the inspection of block 304 is negative (e.g., there is erosion, cracking, etc., that exceeds restoration/repair capabilities) the liner may be discarded or thrown-away in block 306. Otherwise, flow may proceed from block 304 to block 308.

In block 308, the liner is subjected to blending. The blending may entail applying an abrasive or stone to remove a stress concentrator or removing contamination. A wire brush may be applied to remove any grease/film that may be present.

In block 310, the liner is subjected to a welding operation, such as for example an automated welding operation. As used herein, an automated welding operation means that the welding may be performed as a machine-driven operation. The welding operation may include, or be operative on the basis of, an application of a laser weld powder feed or plasma welding. Parameters or parameter values, such as temperature, beam length, intensity, etc., may be varied or selected based on an identification of the liner in order to maximize/increase/enhance the quality of the liner that is produced/restored following block 310. As part of block 310, the liner may be subjected to a low-heat input/weld as described above.

Technical effects and benefits of this disclosure include an enhanced restoration/repair technique as applied to, e.g., a combustor liner. Low temperatures may be used to restore/repair the combustor liner, thereby ensuring that a coating associated with the liner does not melt or deform in conjunction with a base material of the liner. Furthermore, a cold side/surface coating may remain substantially intact during the welding, thereby minimizing/reducing a loss of base material and extending the operational life of the combustor liner. Precise control in terms of a transfer of heat from a weld zone to a combustor liner is provided, such that the likelihood of cracking or thermal induced distortion is minimized.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A method for repairing or restoring a liner associated with a combustor of an aircraft engine, comprising:
    at least partially stripping the liner of at least one detail;
    applying an automated welding operation to the liner, wherein a coating of the liner on a cold side of the liner is retained on the liner during the welding operation; and
    selecting a value for at least one parameter as part of the welding operation based on an identification of the liner.

2. The method of claim 1, wherein the stripping comprises a removal of hardware from the liner.

3. The method of claim 2, wherein the hardware comprises a nut.

4. The method of claim 1, wherein the stripping comprises a removal of a second coating on a hot side of the liner.

5. The method of claim 4, wherein the second coating comprises at least one of a metal or a ceramic material.

6. The method of claim 1, wherein the coating comprises a thermal barrier coating.

7. The method of claim 1, further comprising:
    subjecting the liner to blending prior to applying the welding operation.

8. The method of claim 7, further comprising:
    applying a brush to remove a film from the liner prior to applying the welding operation.

9. The method of claim 1, wherein the welding operation is based on at least one of an application of a laser weld powder feed or plasma welding.

10. The method of claim 1, wherein the at least one parameter comprises at least one of temperature, beam length, or intensity.

11. The method of claim 1, wherein the welding operation is performed at a temperature that ensures that fusion occurs in an amount greater than a first threshold.

12. The method of claim 1, wherein the at least one parameter comprises temperature, beam length, and intensity.

13. The method of claim 1, wherein the coating comprises aluminide.

14. A method for repairing or restoring a liner associated with a combustor of an aircraft engine, comprising:
    at least partially stripping the liner of at least one detail;
    applying an automated welding operation to the liner, wherein a coating of the liner on a cold side of the liner is retained on the liner during the welding operation; and
    selecting a value for at least one parameter as part of the welding operation based on an identification of the liner,
    wherein the at least one parameter consists of temperature, beam length, and intensity.

* * * * *